United States Patent
Taru

(10) Patent No.: US 8,041,170 B2
(45) Date of Patent: Oct. 18, 2011

(54) PHOTONIC BANDGAP FIBER

(75) Inventor: Toshiki Taru, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 219 days.

(21) Appl. No.: 12/393,432

(22) Filed: Feb. 26, 2009

(65) Prior Publication Data

US 2009/0220202 A1 Sep. 3, 2009

(30) Foreign Application Priority Data

Feb. 29, 2008 (GB) .................................. 0803865.5

(51) Int. Cl.
*G02B 6/02* (2006.01)
(52) U.S. Cl. ...................... 385/123; 385/126; 385/127
(58) Field of Classification Search .......... 385/126–129; 264/1.28; 65/393, 409, 411, 429
See application file for complete search history.

(56) References Cited

U.S. PATENT DOCUMENTS

| | | | |
|---|---|---|---|
| 3,504,060 A * | 3/1970 | Gardner | 264/1.28 |
| 3,622,292 A * | 11/1971 | Fleck | 65/409 |
| 5,121,452 A * | 6/1992 | Stowe et al. | 385/46 |
| 5,175,782 A * | 12/1992 | Bowen et al. | 385/51 |
| 5,295,210 A * | 3/1994 | Nolan et al. | 385/43 |
| 5,553,179 A * | 9/1996 | Cryan et al. | 385/43 |
| 6,173,588 B1 * | 1/2001 | Berkey et al. | 65/407 |
| 6,728,439 B2 | 4/2004 | Weisberg et al. | |
| 6,917,741 B2 * | 7/2005 | Fekety et al. | 385/125 |
| 7,072,553 B2 | 7/2006 | Johnson et al. | |
| 7,142,756 B2 * | 11/2006 | Anderson et al. | 385/125 |
| 7,221,840 B2 * | 5/2007 | Vienne et al. | 385/126 |
| 7,643,715 B2 | 1/2010 | Taru et al. | |
| 2002/0164137 A1 | 11/2002 | Johnson et al. | |
| 2003/0031407 A1 | 2/2003 | Weisberg et al. | |
| 2004/0151450 A1 | 8/2004 | Wadsworth et al. | |
| 2004/0175084 A1 | 9/2004 | Broeng et al. | |
| 2005/0041944 A1 | 2/2005 | Cryan et al. | |
| 2007/0163301 A1 | 7/2007 | Dong et al. | |
| 2009/0218706 A1 | 9/2009 | Taru | |

(Continued)

FOREIGN PATENT DOCUMENTS

EP 1 571 470 A1 9/2005

(Continued)

OTHER PUBLICATIONS

X. Feng et al., "Extruded single-mode high-index-core one-dimensional microstructured optical fiber with high-contrast for highly nonlinear optical devices," Applied Physics Letters 87, 081110 (2005).

(Continued)

*Primary Examiner* — Ellen Kim
(74) *Attorney, Agent, or Firm* — McDermott Will & Emery LLP

(57) ABSTRACT

A photonic bandgap optical fiber and a method of manufacturing said fiber is disclosed. The photonic bandgap fiber comprises a core region surrounded by cladding region. The cladding region includes a background optical material having a first refractive index, and elements of optical material having a second refractive index higher than said first refractive index. The elements are arranges periodically in the background optical material. At the drawing temperature of the fibered, the background optical material has a viscosity lower than the viscosity of the optical material of the elements.

6 Claims, 7 Drawing Sheets

U.S. PATENT DOCUMENTS

2009/0220202 A1  9/2009  Taru

FOREIGN PATENT DOCUMENTS

| GB | 2 394 712 A | 5/2004 |
|---|---|---|
| WO | WO 00/37974 | 6/2000 |
| WO | WO 01/31376 A1 | 5/2001 |
| WO | WO 02/26648 A1 | 4/2002 |
| WO | WO 02/072489 A2 | 9/2002 |
| WO | WO 03/079077 A1 | 9/2003 |
| WO | WO 2006/014601 A2 | 2/2006 |

OTHER PUBLICATIONS

UK Intellectual Property Search Report issued in Application No. GB0803865.5 dated Jun. 26, 2008.
U.S. Appl. No. 12/920,037, filed Aug. 27, 2010.
U.S. Appl. No. 12/393,433, filed Feb. 27, 2009.
British Search Report issued in British Patent Application No. GB 0803864.8 dated Jun. 30, 2008.
J. Broeng et al., "Waveguidance by the photonic bandgap effect in optical fibres," J. Opt. A, Pure Appl. Opt. 1, pp. 477-482, 1999.
T.A. Birks et al., "Bend loss in all-solid bandgap fibres," Optics Express, vol. 14, No. 12, pp. 5688-5698, 2006.
Y. Li et al., "Effective index method for all-solid photonic bandgap fibres," J. Opt. A, Pure Appl. Opt. 9, pp. 858-861, 2007.
Z. Wang et al., "Coupling in dual-core photonic bandgap fibers: theory and experiment," Optics Express, vol. 15, No. 8, pp. 4795-4803, 2007.
M.Y. Chen, "All-solid silica-based photonic crystal fibers," Optics Communications, vol. 266, pp. 151-158, 2006.
T. Taru et al., "Raman gain suppression in all-solid photonic bandgap fiber," Proceedings of the 33rd ECOC, pp. 129-130, 2007.
T.A. Birks et al., "Scaling laws and vector effects in bandgap-guiding fibres," Optics Express, vol. 12, No. 1, pp. 69-74, 2004.
G.J. Pearce et al., "Adaptive curvilinear coordinates in a plan-wave solution of Maxwell's equations in photonic crystals," Physical Review B 71, pp. 195108, 2005.
J. M. Stone et al., "An improved photonic bandgap fiber based on an array of rings," Optics Express, vol. 14, No. 13, pp. 6291-6296, 2006.
F.X. Xian et al., "Extruded single-mode high-index one-dimensional microstructured optical fiber with high index-contrast for highly nonlinear optical devices," Applied Physics Letters, vol 87, No. 8, pp. 81110-81112, 2005.
Shepard, J.D., et al., "High energy nanosecond laser pulses delivered single-mode through hollow-core PBG fibers", Optics Express, Feb. 23, 2004, pp. 717-723, vol. 12 No. 4, OSA.
Zenteno, L.A., et al., "Suppression of Raman gain in single-transverse-mode dual-hole-assisted fiber", Optics Express, Oct. 31, 2005, pp. 8921-8926, vol. 13 No. 22, OSA.
Fini, J.M., et al., "Distributed suppression of stimulated Raman scattering in an Yb-doped filter-fiber amplifier", Optics Letters, Sep. 1, 2006, pp. 2550-2552, vol. 31 No. 17, Optical Society of America.
Kim, J., et al., "Suppression of stimulated Raman scattering in high power Yb-doped fiber amplifier using a W-type core with fundamental mode cut-off", Optics Express, Jun. 12, 2006, pp. 5103-5113, vol. 14 No. 12, OSA.
British Search Report Issued in British Patent Application No. GB 0806438.8, dated Jun. 30, 2008.
Taru, Toshiki et al., "Raman Gain Suppression in All-solid Photonic Bandgap Fiber," IEICE Tech Rep, vol. 107, No. 271, OFT2007-37, pp. 29-32, Oct. 2007.
Ren, Guobin et al., "Silica-based Low Loss All-solid Bandgap Fiber," Proc. of COIN-ACOFT 2007, pp. 1-3, Jun. 2007.
Ren, Guobin et al., "Low-loss all-solid photonic bandgap fiber," Optics Letters, vol. 32, pp. 1023-1025, Apr. 2007.
Litchinitser, N., et al., "Resonances in microstructured optical waveguides", Optics Express, May 19, 2003, pp. 1243-1251, vol. 11 No. 10.
P. St. J. Russell, "Photonic-Crystal Fibers," Journal of Lightwave Technology, vol. 24, No. 12, Dec. 2006.
UK Intellectual Property Search Report issued in Application No. GB0803863.0 dated Jun. 25, 2008.
United States Office Action issued in U.S. Appl. No. 12/394,433, mailed May 16, 2011.
U.S. Office Action issued in U.S. Appl. No. 12/393,432, mailed on Jan. 25, 2011.
United States Office Action issued in U.S. Appl. No. 12/394,433 dated May 16, 2011.
Examination Report under Section 18(3) issued in corresponding GB Patent Application No. GB 0803865.5. dated May 25, 2011.

\* cited by examiner

PRIOR ART

PRIOR ART

PRIOR ART
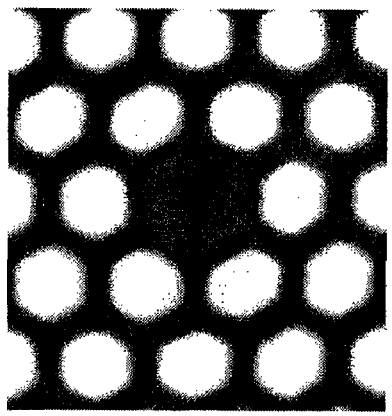 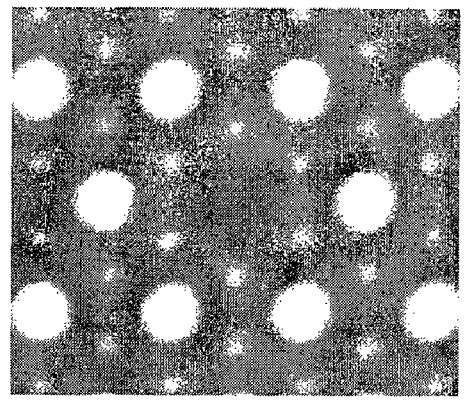
FIG. 7A        FIG. 7B
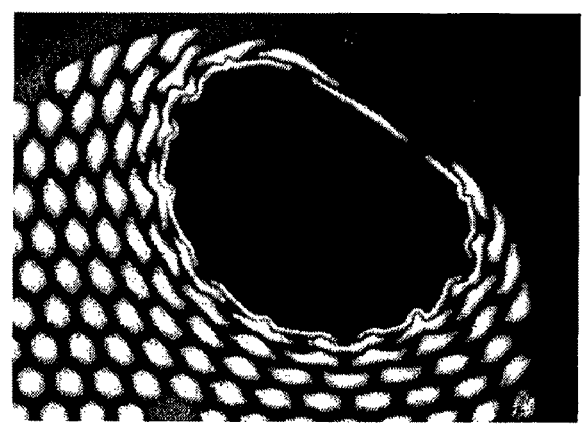
FIG. 8

PHOTONIC BANDGAP FIBER

BACKGROUND OF THE INVENTION

The present invention relates to an optical fiber and in particular to a photonic bandgap optical fiber, and a method of manufacturing the same.

DISCUSSION OF THE PRIOR ART

In recent years, much interest has been focused on developing photonic bandgap materials. These materials usually comprise two or three dimensionally periodic dielectric structures. The dielectric properties of the structures and their arrangement determine the material's light transmission characteristics. Constructive multiple-beam interference in the periodic structure can expel light from the material at certain wavelengths and angles of incidence. The wavelengths at which light is expelled and propagation does not occur is known as the photonic bandgap, and is analogous to the electronic bandgap of solid state materials except that it applies to photons rather than electrons.

Optical fibers have been developed that incorporate photonic bandgap structures. These structures have a two-dimensional periodicity in a plane normal to the direction of propagation, but the structures extend uniformly in the direction of propagation.

In conventional optical fibers, the cladding has a lower refractive index than the core. Light is forced to remain in the core by total internal reflection. In photonic bandgap fibers, the core has a lower refractive index than the cladding. The optical confinement arises by virtue of the cladding exhibiting photonic bandgaps which prevent propagation in the cladding.

Up until recently, optical fibers showing a true photonic bandgap effect have been realized by air-silica structures (FIG. 1). In such structures, air holes are incorporated in the cladding material. However, in the fabrication of these photonic bandgap fibers, it is difficult to control the geometry of the air holes.

Recently, developments in the field of photonic bandgap fibers have resulted in fibers comprising true optical bandgaps with low index contrast and without the need for the inclusion of air holes. Such all-solid fibers include a periodic arrangement of doped glass. For example, FIG. 2 shows schematically a photonic bandgap fiber comprising a periodic arrangement of germanium doped rods 202 formed in the silica cladding 204. The core 206 of the fiber is also silica. In the example in FIG. 2, the photonic bandgap fiber is manufactured from rods stacked together. The core 206 is made from a pure silica rod, and the cladding 204 is made from multimode fiber preform rod with a germanium doped core. The multimode fiber preform rod is stacked around the pure silica rod core. By heating the stacked rods and collapsing, or drawing while the glass is soft, a photonic bandgap fiber can be produced. However, the method and materials used suffer from a number of problems that make the manufacture of solid photonic bandgap fibers difficult. US 2004/0175084 describes an all-solid photonic bandgap fiber similar to that in FIG. 2.

Moreover, current manufacturing techniques do not produce the periodic structure without deformation of the high index regions. The resulting deformation changes the optical properties of the fiber.

SUMMARY OF THE INVENTION

The present invention seeks to overcome problems of the prior art. Accordingly, the present invention provides a drawn photonic bandgap fiber comprising a core region surrounded by a cladding region, wherein the cladding region includes a background optical material having a first refractive index and nodes of optical material, having a second refractive index higher than said first refractive index, which are arranged at regular intervals in said background optical material, the background material having a viscosity which is lower than the viscosity of the optical material of said nodes at the drawing temperature for the fiber.

The background optical material may be doped with fluorine. The concentration of fluorine in the background optical material may be more than 1.5 wt %, or optionally around 2.7 wt %.

The present invention further provides a drawn photonic bandgap fiber comprising a core region surrounded by a cladding region, wherein the cladding region includes a background optical material having a first refractive index and elements of optical material, having a second refractive index higher than said first refractive index, which are arranged at regular intervals in said background optical material, wherein the background optical material is comprised of silica doped with fluorine; and the elements are comprised of silica doped with germanium. The elements are arranged at regular intervals normal to the propagation direction of light, but extend in the propagation direction of the light.

The present invention also provides a method of manufacturing photonic bandgap fiber comprising a core region surrounded by a cladding region, wherein the cladding region includes a background optical material with high index features arranged at regular intervals, the method comprising the steps of stacking together rods with a core of high refractive index in a regular periodic arrangement, at the centre of the arrangement is placed a rod with a core that does not have a high refractive index; heating the stacked rods to a process temperature; and drawing a fiber from the stacked heated rods, wherein the viscosity of the core of the rods forming the periodically arranged features is not lower than that of the surrounding background optical material.

The periodically arranged rods with a core of high refractive index include a cladding that may be doped with fluorine. The concentration of fluorine in the cladding may be around 2.7 wt %.

BRIEF DESCRIPTION OF THE DRAWINGS

The prior art and embodiments of the invention will now be described, by way of example only, with reference to the accompanying drawings of which:

FIG. 7A shows a cross-section through a photonic band gap fiber with a silica glass core and germanium doped high index regions in the cladding (prior art);

FIG. 7B shows a cross-section through a photonic bandgap fiber of the present invention, the fiber having a fluorine doped silica core, and cladding with germanium doped high index regions in a fluorine doped silica background;

FIG. 8 shows a bubble formed in the fiber of FIG. 7A when at a processing temperature of 1950° C.

DETAILED DESCRIPTION OF THE PREFERRED EMBODIMENTS

Figure 1:
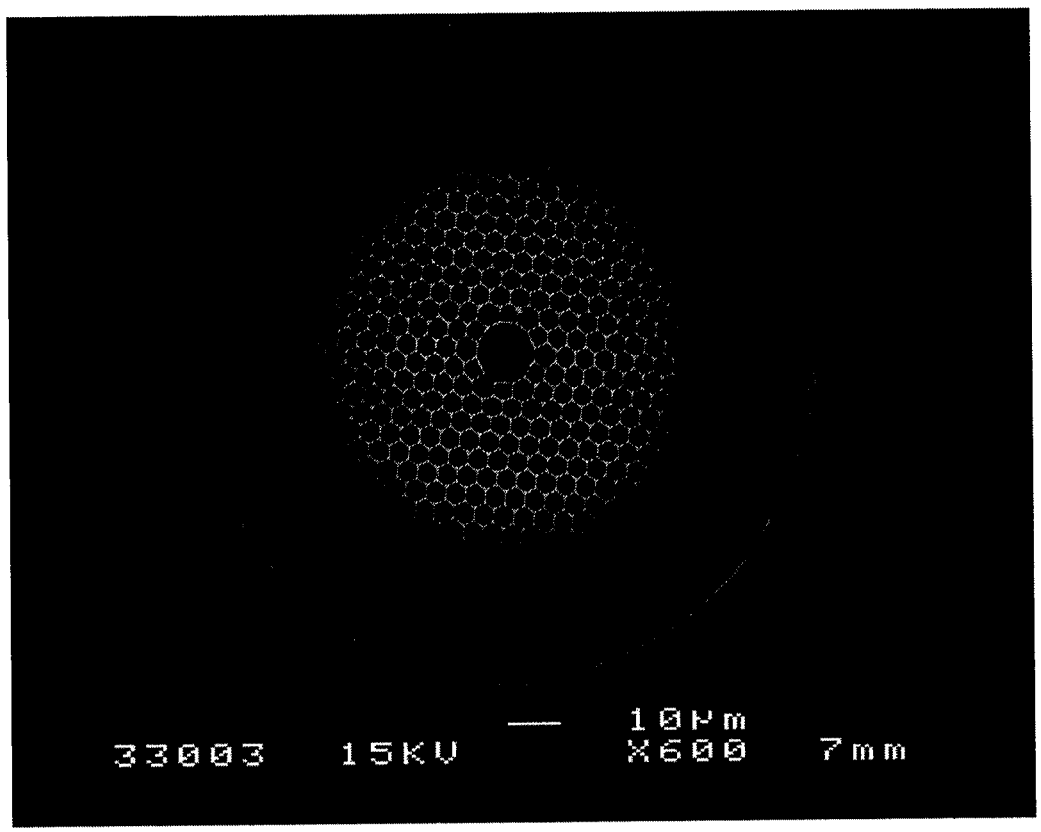
FIG. 1 is an SEM image of a photonic band gap fiber with air holes as known from the prior art.
Figure 2:
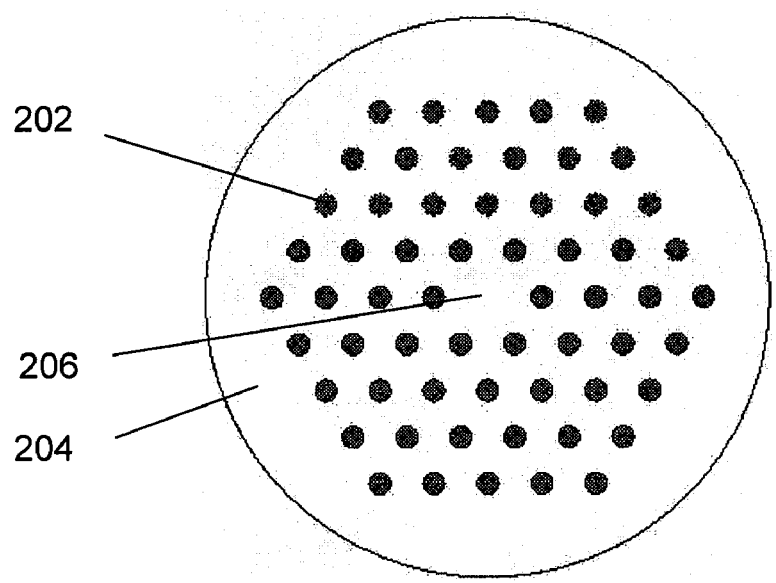
FIG. 2 is a representation of a photonic band gap fiber of the prior art. The cladding of this fiber is made from multimode fiber preform with germanium doped cores.
Figure 3:
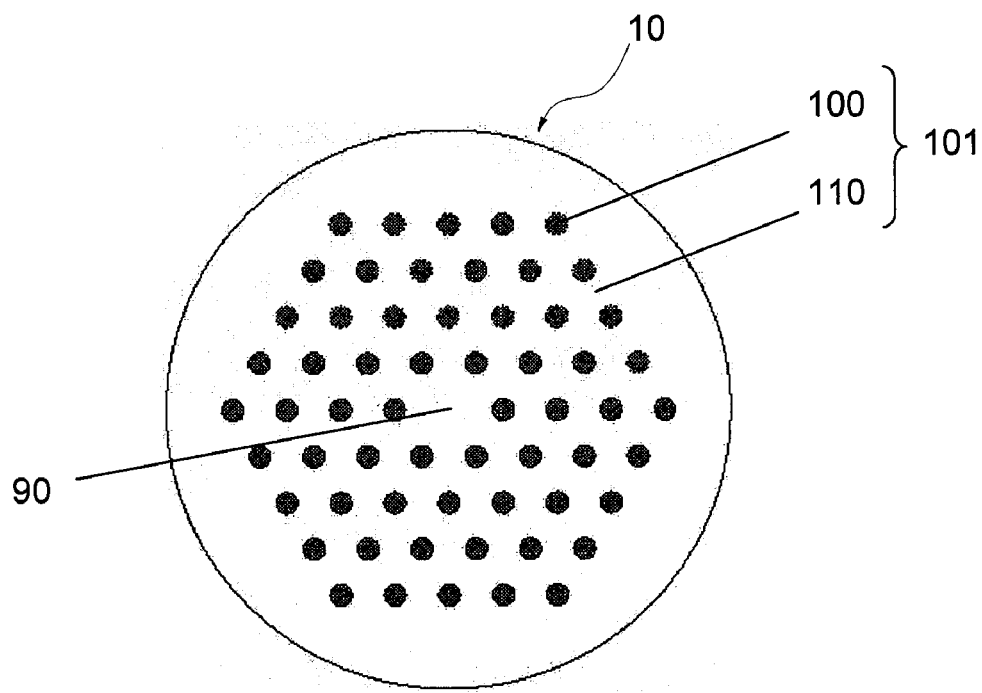
FIG. 3 is a representation of a photonic band gap fiber with fluorine doping.

FIG. 3 shows a schematic representation of the structure of a photonic bandgap optical fiber 10 according to the present invention, when viewed in cross-section normal to the direction of propagation of light in the fiber. The fiber 10 has core and cladding regions. The core 90 is a region of low refractive index. The surrounding cladding region 101 is also of low refractive index (110) but with high refractive index regions 100. The high refractive index regions 100 are arranged periodically around the centre core 90. The periodic arrangement may be based on hexagonal, triangular, or other close packing shapes.

The high refractive index regions 100 comprise germanium doped silica glass, whereas the low refractive index regions 110 comprise fluorine doped silica glass. Other material systems may be used for example boron doped silica glass may instead be used for the low refractive index regions. Alternatively, glass other than silica glass may be used as the basic material for the formation of the optical fiber.

The use of fluorine as dopant for the low refractive index regions 110 has certain advantages. These result in an easier manufacturing method and a resultant fiber with improved structural regularity. The method of manufacturing the photonic bandgap fiber 10 is now described in detail.

Figure 4:
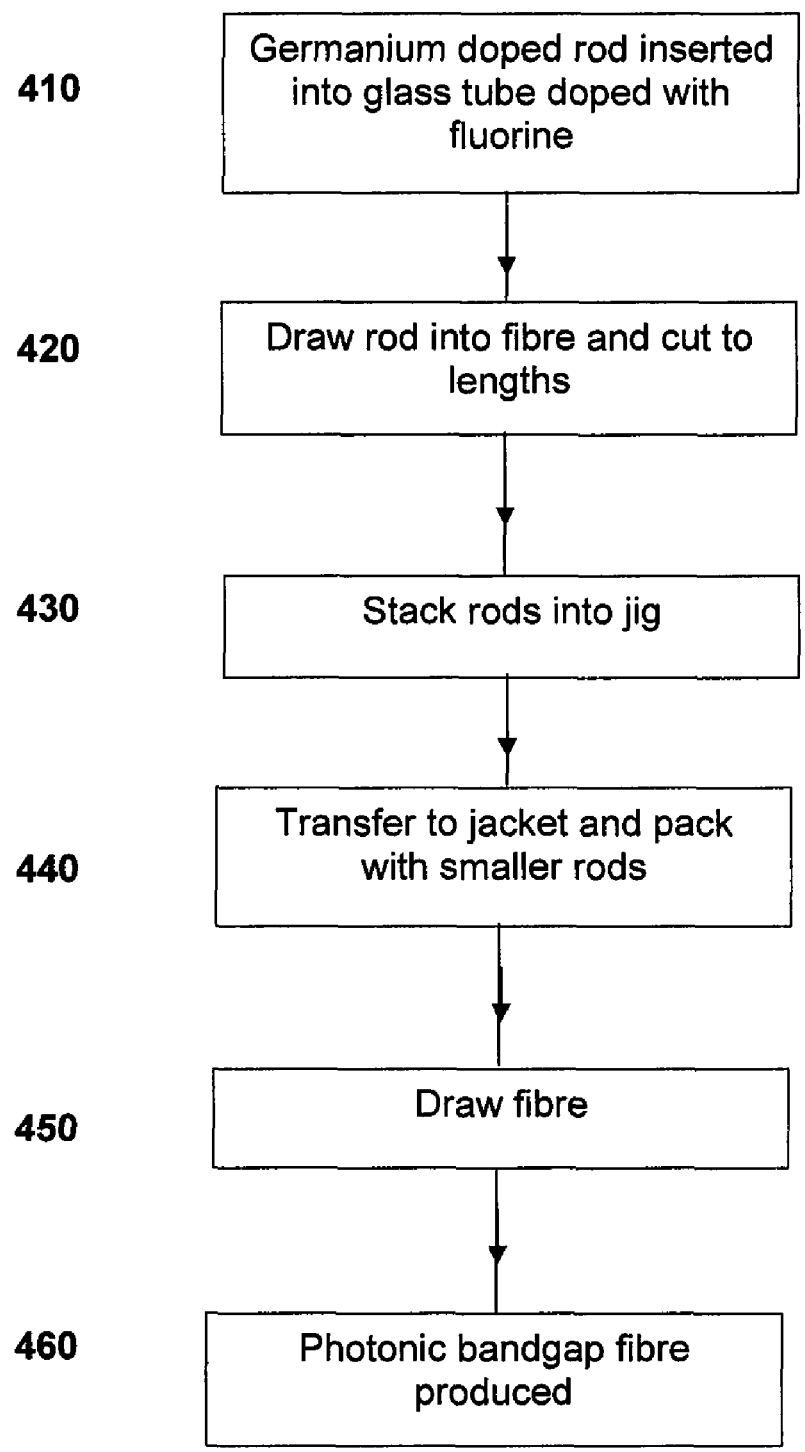
FIG. 4 shows the process flow for manufacturing a photonic bandgap fiber according to the present invention.

FIG. 4 shows a flow chart describing the key steps involved in the manufacture of the photonic band gap material. At step 410, a glass rod with germanium doping is inserted into a glass tube doped with fluorine. A glass body is formed by creating a vacuum between the rod and tube, then heating the rod and tube until the tube collapses onto the rod—the collapse method, which is well known in the art.

The germanium dioxide concentration in the glass rod may be approximately 30 mol % producing a refractive index 2.3% higher than that of pure silica glass. The fluorine concentration in the glass pipe may be around 2.7 wt % resulting in a refractive index 0.7% lower than that of silica glass. (In the present description, a refractive index is expressed as a value relative to $$SiO_2, \text{ namely, } \frac{n - n_{silicaglass}}{n}.)$$

At step 420, the glass body is drawn and cut into a plurality of rods.

Figure 5A:
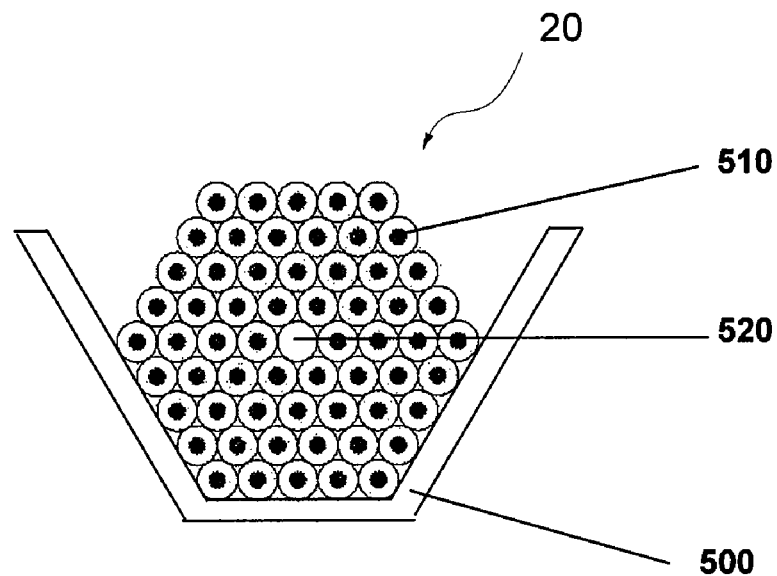
FIG. 5A shows rods stacked in preparation for fiber drawing.
Figure 5B:
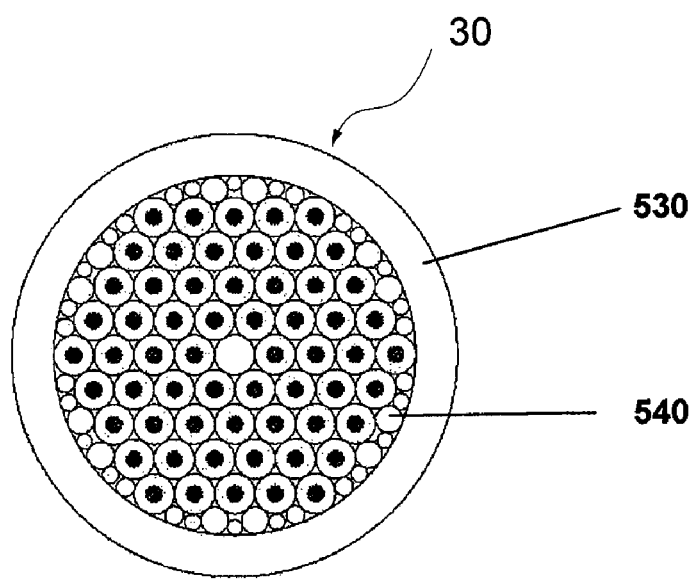
FIG. 5B shows schematically the rods of FIG. 5A enclosed in a silica tube jacket.

At step 430, the rods are placed in a stacking jig 500, shown in FIG. 5A. The germanium/fluorine doped rods 510 from step 420 are stacked along with a single further rod 520 doped only with fluorine. This single rod 520 has the same diameter as the rods 510 from step 420 and is doped with fluorine to the same concentration as the pipe in step 410, namely around 2.7 wt % resulting in a refractive index 0.7% lower than of pure silica glass. The germanium/fluorine doped rods 510 and fluorine doped rod 520 are stacked such that they have a cross-section with a hexagonal structure (stacking arrangement 20). The fluorine doped rod 520 is placed at the centre of the stacking arrangement 20. Once stacked in a hexagonal arrangement 20 as shown schematically in FIG. 5A, the arrangement 20 of rods is transferred into a fluorine doped silica tube 530, FIG. 5B. This tube 530 acts as a jacket around the rods 510, 520. Any interspaces between the rods 510 and the jacket 530 may be filled using fluorine doped rods 540 of various diameters, particularly diameters smaller than the diameter of the rods 510 and 520. Small interspaces will remain between the adjacent rods, and rods and the jacket. These interspaces will be filled during the drawing process by action of heat and a reduced pressure inside the tube 530 used during the drawing process.

Figure 6:
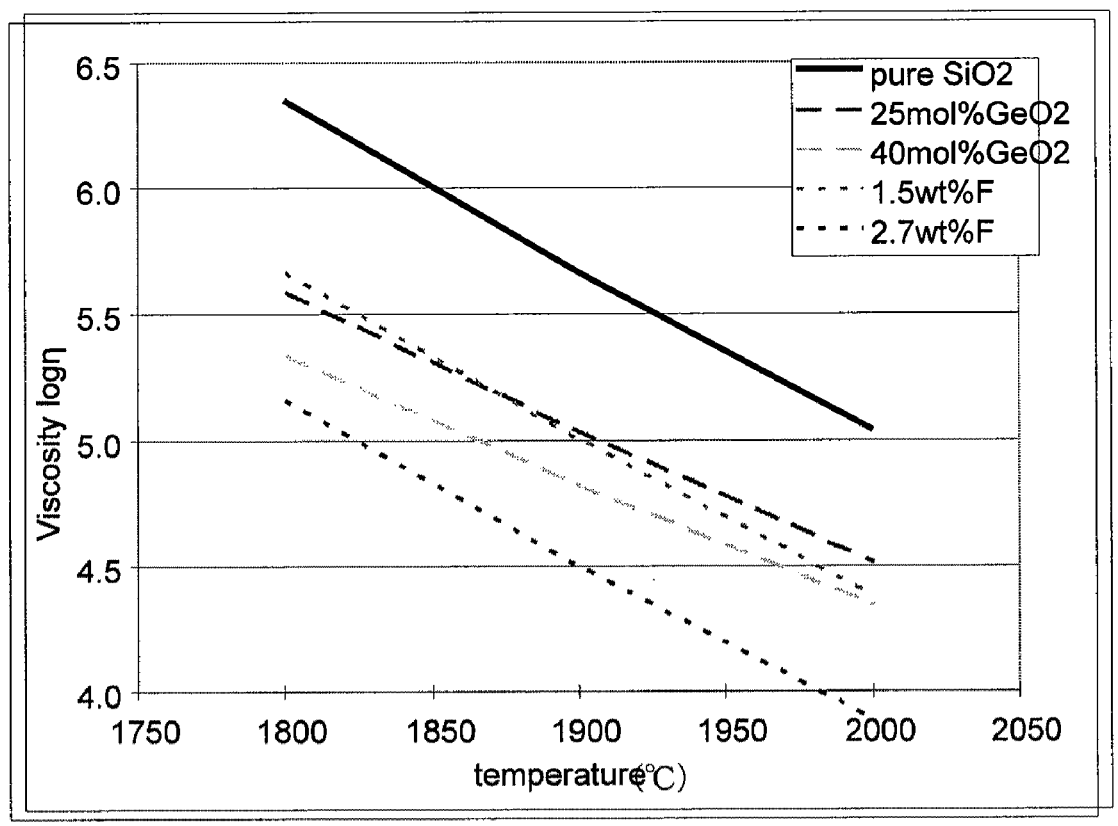
FIG. 6 is a graph showing the variation in viscosity with temperature for undoped silica glass, and silica glass doped with germanium or fluorine.

The drawing process is performed at a temperature high enough such that the glass rods 510, 520, 540 soften, but the temperature must not be too high or bubbles may occur in the glass. The viscosity, η, (in Pa s) of various glass types mentioned above is plotted versus temperature in FIG. 6, and listed below in Table.

TABLE

| | | Pure SiO$_2$ | 30 mol % GeO$_2$ | 40 mol % GeO$_2$ | 1.5 wt % F | 2.7 wt % F |
|---|---|---|---|---|---|---|
| Δ refractive index relative to SiO$_2$ | | 0% | 2.3% | 3% | −0.4% | −0.7% |
| log η at temperature/ ° C. | 1800 | 6.4 | 5.6 | 5.3 | 5.7 | 5.2 |
| | 1900 | 5.7 | 5.0 | 4.8 | 5.0 | 4.5 |
| | 2000 | 5.0 | 4.5 | 4.3 | 4.4 | 3.9 |

Drawing the photonic bandgap fiber from the preform block 30 is best performed at viscosities where log η<5.0. If the viscosity is above this value the tensile force required to draw the fiber is so large that the drawn optical fiber is prone to fracture and breaking.

As can be seen from Table, pure silica fiber requires a higher temperature than the germanium doped fiber to reach the required viscosity. In the prior art example of silica fiber with germanium doped high index regions, the preform must be heated to around 2000° C. to achieve the required viscosity. At this temperature, the high index germanium doped regions have a lower viscosity than that of the surrounding silica and are hence deformed from their normal circular shape during the process of drawing the fiber (FIG. 7A). Moreover, the pure silica surrounding material with the highly germanium doped high index cores is prone to the forming of bubbles at temperatures above 1950° C., as shown in FIG. 8.

In the above described embodiment of the present invention, the surrounding silica material (low refractive index regions 110) is doped with fluorine, and the germanium doped silica forms the periodically arranged high index regions 100 as shown in FIG. 3. In this system, relative viscosities are changed in comparison to the prior art material systems. In particular, for a material system having germanium doped high index regions with 30 mol % germanium dioxide, and low index regions with 2.7 wt % fluorine, the viscosity of the high index regions 100 is higher than that of low index region. In this case, the shape of the high refractive index regions 100 is maintained through the fiber drawing process and the resulting fiber is shown in FIG. 7b. The glass that is deformed to fill the interspaces between rods mainly comes from the fluorine doped silica. This is because it has a lower viscosity than the germanium doped region.

By using this method and material system, the viscosities for both high index regions 100 and low index region 110 are such that $\log \eta < 5.0$ at around 1900° C., and therefore the temperature at which fiber pulling may occur is lowered and the risk of bubbles forming is reduced. Moreover, using the above identified materials (30 mol % $GeO_2$, 2.7 wt % F) a difference in the refractive index between the high index regions 100 and low index regions 110 of around 3% can be produced. This is comparable to a system of pure silica glass low index region with 40 mol % germanium dioxide doped high index regions. Thus, refractive index contrast has been maintained. Moreover, improved fiber characteristics will result because the high index regions 100 will not be deformed and the formation of bubbles will be suppressed.

Alternative embodiments may use other concentrations of fluorine and germanium, such as up to 40 mol % germanium and down to 1.5 wt % fluorine.

Figure 9:
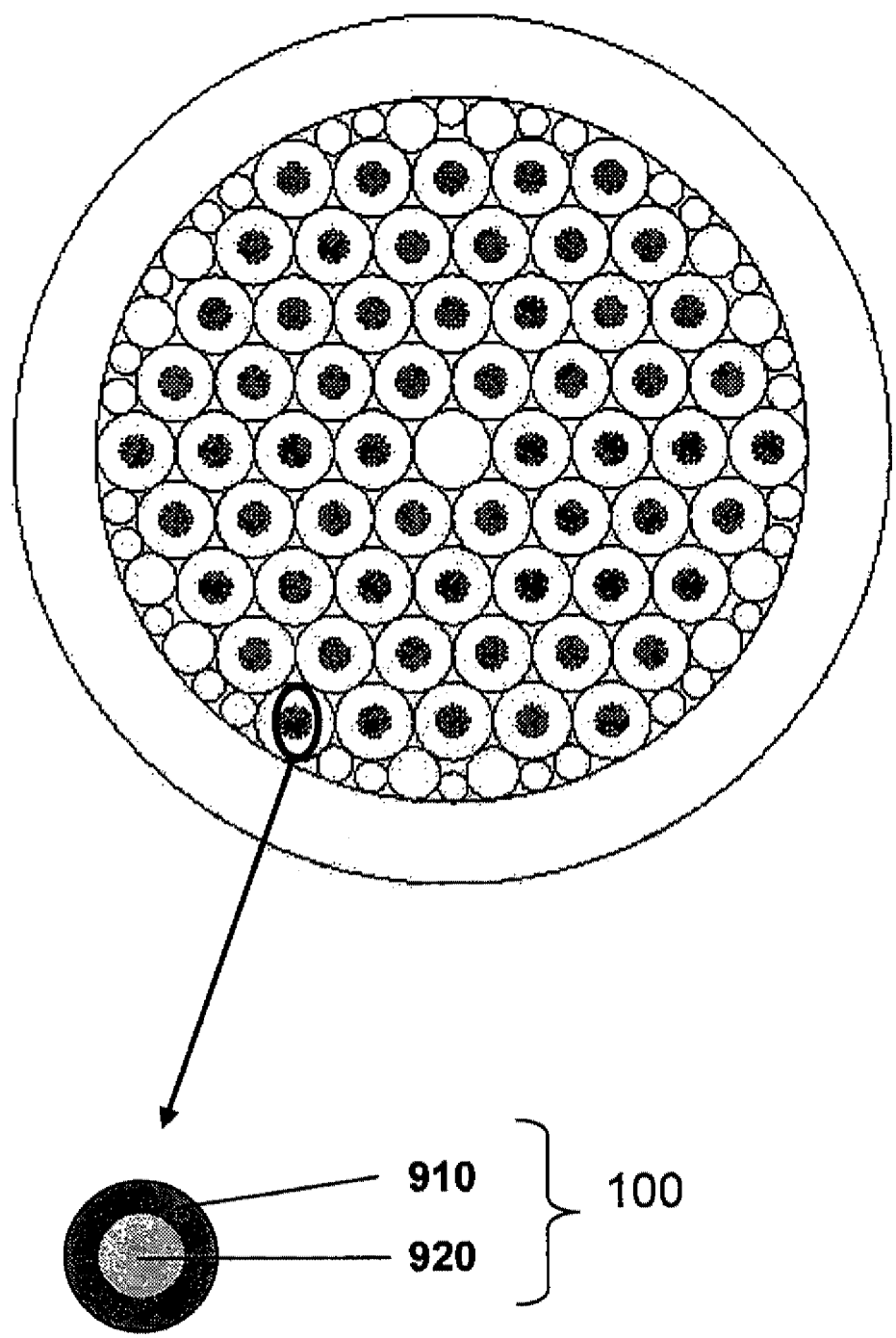
FIG. 9 shows an alternative embodiment of the present invention.

In an another alternative embodiment, shown in FIG. 9, the above method of manufacturing may be applied to a fiber that during the drawing process has a different viscosity configuration to that described above. In this case, the rods forming the cladding have a non-uniform viscosity across the high index region 100. In particular, in the centre 910 of the high index region 100, the material may have a viscosity lower than that at the edges 920 of the high index region 100. Also, the higher viscosity region 910 has a larger viscosity than the background material. In this case, the higher viscosity region 910 will prevent the lower viscosity centre region 920 from being deformed.

It will be appreciated that various modifications may be made to the above described invention while still falling within the scope of the appended claims. In particular, the materials used are not limited to those identified in the description but other materials, glass types, and dopants may be used.

The invention claimed is:

1. A drawn photonic bandgap fiber comprising a core region surrounded by a cladding region,
   wherein the cladding region includes a background optical material having a first refractive index and elements of optical material having a second refractive index higher than said first refractive index, which are arranged periodically in said background optical material, the background material having a viscosity which is lower than the viscosity of the optical material of said elements at the drawing temperature for the fiber.

2. The photonic band gap fiber of claim 1,
   wherein the background optical material is comprised of silica doped with fluorine.

3. The photonic bandgap fiber of claim 2,
   wherein the concentration of fluorine in the background optical material is more than 1.5 wt %.

4. The photonic bandgap fiber of one of claim 1, 2 or 3,
   wherein the elements are comprised of silica doped with germanium.

5. The photonic bandgap fiber of claim 4,
   wherein the concentration of germanium dioxide in the elements is approximately 30 mol %.

6. The photonic bandgap fiber of any previous claim one of claim 1, 2 or 3,
   wherein the core of the fiber is formed of the same material as the background optical material.

\* \* \* \* \*